(12) United States Patent
Niwa et al.

(10) Patent No.: US 8,593,744 B2
(45) Date of Patent: Nov. 26, 2013

(54) OPTICAL DEVICE AND MANUFACTURING METHOD THEREFOR

(75) Inventors: Shinichi Niwa, Nagano (JP); Masao Takemura, Nagano (JP); Hiromitsu Takei, Nagano (JP); Akira Mori, Nagano (JP)

(73) Assignee: Nidec Sankyo Corporation (JP)

( * ) Notice: Subject to any disclaimer, the term of this patent is extended or adjusted under 35 U.S.C. 154(b) by 90 days.

(21) Appl. No.: 13/305,957

(22) Filed: Nov. 29, 2011

(65) Prior Publication Data
US 2012/0134034 A1    May 31, 2012

(30) Foreign Application Priority Data
Nov. 30, 2010   (JP) ................................ 2010-266749

(51) Int. Cl.
G02B 7/02   (2006.01)
(52) U.S. Cl.
USPC ..... 359/824; 359/814; 310/12.02; 310/12.04; 310/12.16; 310/12.27; 310/15
(58) Field of Classification Search
USPC ............... 359/813, 814, 822–824; 310/12.02, 310/12.04, 12.27, 14, 15; 369/44.14–44.16; 228/159, 203; 209/602
See application file for complete search history.

(56) References Cited

U.S. PATENT DOCUMENTS

| | | | | |
|---|---|---|---|---|
| 7,227,285 B2* | 6/2007 | Osaka | ............................. | 310/15 |
| 7,271,511 B2* | 9/2007 | Osaka | ......................... | 310/12.27 |
| 7,285,879 B2* | 10/2007 | Osaka | ......................... | 310/12.02 |
| 7,291,942 B2* | 11/2007 | Osaka | ......................... | 310/12.04 |

FOREIGN PATENT DOCUMENTS

JP    2010-217467 A    9/2010

* cited by examiner

*Primary Examiner* — Loha Ben
(74) *Attorney, Agent, or Firm* — Cantor Colburn LLP

(57) ABSTRACT

An optical device may include a movable body holding a lens, a fixed body movably holding the movable body, a drive magnet and a drive coil for relatively moving the movable body with respect to the fixed body, and a metal member fixed to the drive magnet. The drive magnet is fixed to one of the movable body and the fixed body and the drive coil is fixed to the other of the movable body and the fixed body. A nickel plating layer containing at least nickel is formed on a surface of the drive magnet and a surface of the metal member, and the drive magnet and the metal member are joined to each other by a joining layer which is made of tin-based metal containing at least tin and is disposed between the drive magnet and the metal member.

25 Claims, 13 Drawing Sheets

OPTICAL DEVICE AND MANUFACTURING METHOD THEREFOR

CROSS REFERENCE TO RELATED APPLICATION

The present invention claims priority under 35 U.S.C. §119 to Japanese Application No. 2010-266749 filed Nov. 30, 2010, the entire content of which is incorporated herein by reference.

FIELD OF THE INVENTION

At least an embodiment of the present invention may relate to an optical device which is provided with a movable body holding a lens for photography and a fixed body movably holding the movable body and at least an embodiment of the present invention may relate to a manufacturing method for the optical device.

BACKGROUND

Conventionally, as a lens drive device for driving a photographing lens of a camera which is mounted on a cellular phone or the like, the present applicant has previously proposed a lens drive device which is provided with a movable body holding a plurality of lenses and being moved in an optical axis direction, a fixed body movably holding the movable body in the optical axis direction, and a drive mechanism for driving the movable body in the optical axis direction (see, for example, Japanese Patent Laid-Open No. 2010-217467). The lens drive device described in the Patent Literature is formed in a substantially rectangular prism shape.

In the lens drive device, the drive mechanism is provided with four drive magnets formed in a substantially triangular prism shape and four drive coils which are wound around in a substantially triangular tube-like shape. The drive magnet is structured of two drive magnet pieces and a magnetic plate. The two drive magnet pieces and the magnetic plate are fixed to each other so that the magnetic plate is sandwiched by the two drive magnet pieces in an optical axis direction. The two drive magnet pieces and the magnetic plate are fixed to each other with an adhesive. The two drive magnet pieces are magnetized so that magnetic poles of opposing faces of the two drive magnet pieces which face each other through the magnetic plate are the same magnetic pole.

Further, the drive magnet is disposed at four corners of the lens drive device and one end face of the drive magnet in the optical axis direction is fixed to a cover member structuring the fixed body with an adhesive. Further, a magnetic piece is fixed to the other end face of the drive magnet in the optical axis direction with an adhesive. The drive coil is fixed to the movable body so that an outer peripheral face of the drive magnet and an inner peripheral face of the drive coil are faced each other through a predetermined gap space.

In recent years, in a market of a camera which is mounted on a cellular phone or the like, the requirement for reducing the size of the camera has been further increased and, in order to meet the requirement, the requirement for reducing the size of a lens drive device used in the camera has been also increased. In the lens drive device described in the above-mentioned Patent Literature, in order to further reduce the size of the device, the drive magnet and the drive coil are required to be small. On the other hand, when the drive magnet and the drive coil are small, a drive force of the drive mechanism for driving the movable body is lowered and thus a gap space between the drive magnet and the drive coil is required to be narrow for preventing lowering of the drive force of the drive mechanism.

In a case that a gap space between the drive magnet and the drive coil is set to be narrow, when the gap space is not formed with a high degree of accuracy, the fixed body to which the drive magnet is fixed and the movable body to which the drive coil is fixed may be interfered with each other to cause a problem in movement of the movable body. However, in the lens drive device described in the above-mentioned Patent Literature, since two drive magnet pieces and a magnetic plate are fixed to each other with an adhesive, in a case that the size of the drive magnet is reduced, the adhesive may be protruded from a space between the drive magnet piece and the magnetic plate unless a coating amount and an applied position of the adhesive are strictly controlled. Therefore, in the above-mentioned lens drive device, when a gap space between the drive magnet and the drive coil is set to be narrow with downsizing of the drive magnet and the drive coil, a problem may occur in movement of the movable body due to the adhesive which is protruded from a space between the drive magnet piece and the magnetic plate.

SUMMARY

In view of the problem described above, at least an embodiment of the present invention may advantageously provide an optical device which is provided with a movable body holding a lens for photography and a fixed body movably holding the movable body and is capable of appropriately moving the movable body even when the size of the device is reduced. Further, at least an embodiment of the present invention may advantageously provide a manufacturing method for the optical device.

According to at least an embodiment of the present invention, there may be provided an optical device including a movable body which holds a lens for photography, a fixed body which movably holds the movable body, a drive magnet and a drive coil for relatively moving the movable body with respect to the fixed body, and a metal member which is fixed to the drive magnet. The drive magnet is fixed to one of the movable body and the fixed body, and the drive coil is fixed to the other of the movable body and the fixed body, and the drive magnet and the drive coil are oppositely disposed to each other through a predetermined gap space. In addition, a nickel plating layer containing at least nickel is formed on a surface of the drive magnet and a surface of the metal member, and the drive magnet and the metal member are joined to each other by a joining layer which is made of tin-based metal containing at least tin and is disposed between the drive magnet and the metal member.

In accordance with an embodiment of the present invention, a tin plating layer which covers the nickel plating layer is formed on the surface of the drive magnet before the metal member is joined to the drive magnet, and the joining layer is formed by melting and solidifying the tin plating layer at a time of joining of the drive magnet to the metal member.

In the optical device in accordance with the embodiment of the present invention, the drive magnet and the metal member are joined to each other through a joining layer which is made of tin-based metal and is disposed between the drive magnet and the metal member. Therefore, for example, when a tin plating layer which is formed to cover a nickel plating layer on the surface of the drive magnet before joined to the metal member is melted and solidified at the time when the drive magnet and the metal member are to be joined to each other, the joining layer is formed and the drive magnet and the metal member are joined to each other. Accordingly, in the embodiment of the present invention, the joining layer is prevented from protruding from a space between the drive magnet and the metal member which have been joined to each other. As a result, according to the embodiment of the present invention, even when a gap space between the drive magnet and the drive coil is set to be narrow in order to prevent a drive force from being lowered due to downsizing of the drive magnet and the drive coil, the gap space between the drive magnet and the drive coil is formed with a high degree of accuracy and thus an interference of the movable body with the fixed body is prevented. In other words, according to the embodiment of the present invention, even when the size of the optical device is reduced by reducing the sizes of the drive magnet and the drive coil and by narrowing a gap space between the drive magnet and the drive coil, an interference of the movable body with the fixed body is prevented and the movable body is moved appropriately.

In accordance with an embodiment of the present invention, the tin plating layer is melted by induction heating at the time of joining of the drive magnet to the metal member. In accordance with an embodiment of the present invention, the tin plating layer may be melted by abutting a heater chip with the metal member and the like at the time of joining of the drive magnet to the metal member. However, in this case, a temperature of the metal member may become non-uniform according to an abutting condition of the heater chip with the metal member and thus a joining strength of the drive magnet to the metal member may be varied. On the other hand, in a case that the tin plating layer is to be melted by induction heating, the drive magnet and the metal member are set in the induction coil and the metal member and the like are heated. As a result, the tin plating layer is melted and thus the temperature of the metal member becomes uniform and variation of the joining strength of the drive magnet to the metal member can be prevented. Further, in a case that the tin plating layer is melted by abutting the heater chip with the metal member, a relative position of the drive magnet and the metal member may be displaced due to abutting of the heater chip with the metal member when the tin plating layer is to be melted. On the other hand, in a case that the tin plating layer is melted by induction heating, the tin plating layer is melted without abutting of the drive magnet and the metal member with the induction coil and thus displacement of a relative position of the drive magnet from the metal member is prevented when the tin plating layer is to be melted.

In accordance with an embodiment of the present invention, the metal member is fixed to an end face of the drive magnet in an optical axis direction of the lens, and the drive magnet and the drive coil are oppositely disposed to each other through a predetermined gap space in a direction perpendicular to the optical axis direction of the lens.

In accordance with an embodiment of the present invention, at least a part of the joining layer and the drive coil are oppositely disposed to each other through a predetermined gap space. According to the embodiment of the present invention, protruding of the joining layer from a space between the drive magnet and the metal member which have been joined to each other is prevented and thus, even when at least a part of the joining layer and the drive coil are oppositely disposed to each other through a predetermined gap space, an interference of the movable body with the fixed body is prevented.

In accordance with an embodiment of the present invention, the optical device is, as the metal member, provided with a first metal member and a second metal member which are fixed to the drive magnet so that the drive magnet is sandwiched. In this case, for example, in a case that the drive magnet and the metal member are to be joined to each other, when the first metal member and the second metal member disposed so that the drive magnet is sandwiched are heated and the tin plating layers on the surfaces of the drive magnet are melted and solidified, the drive magnet, the first metal member and the second metal member are fixed to each other at a time.

In accordance with an embodiment of the present invention, the optical device is provided with one piece of the first metal member, a plurality of the second metal members, and a plurality of the drive magnets. Each of the plurality of the second metal members is fixed to each of the plurality of the drive magnets, and each of the plurality of the second metal member is formed with a removing trace which is formed when a connecting member for connecting the plurality of the second metal members with each other has been removed. In other words, it is preferable that a plurality of the second metal members before being joined to a plurality of the drive magnets is connected with each other through a connecting member. According to this structure, after a plurality of the second metal members having been connected with each other and a plurality of the drive magnets are joined to each other, the connecting member can be removed. Therefore, when the second metal members and the drive magnets are to be joined to each other, displacement of relative position between a plurality of the second metal members is prevented and thus relative positional accuracy between a plurality of the second metal members after having been joined can be enhanced.

In accordance with an embodiment of the present invention, the removing trace is formed at a tip end of a protruded part whose base end part is connected with the second metal member and a width of the removing trace is narrower than a width of the base end part of the protruded part and/or a thickness of the removing trace is thinner than a thickness of the base end part of the protruded part. According to this structure, after a plurality of the second metal members having been connected with each other and a plurality of the drive magnets are joined to each other, the connecting member is easily removed from a plurality of the second metal members. Therefore, after a plurality of the second metal members having been connected with each other and a plurality of the drive magnets are joined to each other, even when the connecting member is removed from a plurality of the second metal members, fixed positions of the second metal members fixed to the drive magnets are prevented from being displaced.

In accordance with an embodiment of the present invention, the movable body is held by the fixed body movably in the optical axis direction of the lens, the drive coil is fixed to the movable body, the drive magnet is fixed to the fixed body, and the drive coil and the drive magnet relatively move the movable body in the optical axis direction with respect to the fixed body. In other words, the optical device is, for example, an optical device which is provided with a structure for adjusting a focus position of an optical image.

In accordance with an embodiment of the present invention, the drive magnet is formed in a substantially columnar shape or a substantially flat plate shape and is magnetized so that a magnetic pole of one face and a magnetic pole of the other face in the optical axis direction are different from each other, the drive coil is oppositely disposed to a side face of the drive magnet in a direction perpendicular to the optical axis direction through a predetermined gap space so as to cover a part of the side face of the drive magnet, and the metal member is fixed to each of both sides of the drive magnet in the optical axis direction. In this case, for example, the metal member which is fixed to one face of the drive magnet in the optical axis direction is a cover member structuring an outer peripheral face of the optical device, and the cover member is formed to cover the metal member which is fixed to the other face of the drive magnet in the optical axis direction.

In accordance with an embodiment of the present invention, the movable body is movably held by the fixed body so that an optical axis of the lens is inclined, the drive coil is fixed to the movable body, the drive magnet is fixed to the fixed body, and the drive coil and the drive magnet swings the movable body with respect to the fixed body. In other words, the optical device is, for example, an optical device which is provided with a structure for correcting a shake of an optical image.

In accordance with an embodiment of the present invention, the drive magnet is formed in a substantially flat plate shape and is magnetized so that a magnetic pole of one side face and a magnetic pole of the other side face in a direction perpendicular to the optical axis direction are different from each other, the drive coil is oppositely disposed to a side face of the drive magnet in a direction perpendicular to the optical axis direction through a predetermined gap space, and the metal member is fixed to each of both end faces of the drive magnet in the optical axis direction. Further, in this case, the optical device is provided with a plurality of drive magnets and a plurality of drive coils and the plurality of the drive magnets is fixed to an outer peripheral face of the movable body. The fixed body is provided with a case body which is formed in a substantially tube-like shape and structures an outer peripheral face of the optical device, the plurality of the drive coils is fixed to an inner peripheral face of the case body so as to respectively face the plurality of the drive magnets, and the plurality of the drive magnets is connected by the metal member.

Further, according to at least an embodiment of the present invention, there may be provided a manufacturing method for an optical device provided with a movable body which holds a lens for photography, a fixed body which movably holds the movable body, a drive magnet and a drive coil for relatively moving the movable body with respect to the fixed body, and a metal member which is fixed to the drive magnet. The drive magnet is fixed to one of the movable body and the fixed body, and the drive coil is fixed to the other of the movable body and the fixed body, and the drive magnet and the drive coil are oppositely disposed to each other through a predetermined gap space. In the optical device, the manufacturing method includes forming a nickel plating layer containing at least nickel on a surface of the drive magnet and a surface of the metal member, forming a tin plating layer which is made of tin-based metal containing at least tin on the surface of the drive magnet before the metal member is joined so as to cover the nickel plating layer, and melting and solidifying the tin plating layer to join the drive magnet and the metal member to each other at a time of joining of the drive magnet to the metal member.

In accordance with an embodiment of the present invention, the tin plating layer is melted by heating when the drive magnet and the metal member are held in a pressurized state. For example, the tin plating layer is melted by induction heating. In this case, it may be manufactured that the drive magnet before being joined to the metal member is in a non-magnetized state, and the drive magnet is magnetized after the drive magnet and the metal member are joined to each other.

According to the manufacturing method for an optical device in accordance with the embodiment of the present invention, the drive magnet and the metal member are joined to each other by melting and solidifying the tin plating layer. Therefore, according to the embodiment of the present invention, the joining layer is prevented from protruding from a space between the drive magnet and the metal member having been joined. In other words, according to the embodiment of the present invention, even when the size of the optical device is reduced by reducing the sizes of the drive magnet and the drive coil and by narrowing a gap space between the drive magnet and the drive coil, an interference of the movable body with the fixed body is prevented and the movable body is moved appropriately.

In accordance with an embodiment of the present invention, the drive magnet is comprised of a plurality of the drive magnets, the metal member is comprised of a plurality of the metal members which is fixed to each of the plurality of the drive magnets, and each of the plurality of the metal members is formed so that, after the plurality of the drive magnets and the plurality of the metal members are joined to each other in a state that the plurality of the metal members are connected with each other through a connecting member, the connecting member is removed. According to the embodiment of the present invention, after a plurality of the metal members having been connected with each other and a plurality of the drive magnets are joined to each other, the connecting member is removed. Therefore, when the metal members and the drive magnets are to be joined to each other, displacement of relative position between a plurality of the metal members is prevented and thus relative positional accuracy between a plurality of the metal members after having been joined can be enhanced.

In accordance with an embodiment of the present invention, the connecting member is connected with the plurality of the metal members through respective connecting parts, and the connecting part is provided with a cutting-off part at least whose width is narrow or whose thickness is thin and, after the plurality of the drive magnets and the plurality of the metal members have been joined to each other, the connecting member is removed by cutting off the cutting-off part. According to the embodiment of the present invention, after a plurality of the metal members having been connected with each other and a plurality of the drive magnets are joined to each other, the connecting member is easily removed from a plurality of the metal members. In accordance with an embodiment of the present invention, when the cutting-off part is formed so that its width is narrow and its thickness is thin so as to be capable of being disconnected by bending repeatedly, the cutting-off part is further easily disconnected.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE PREFERRED EMBODIMENTS

Embodiments of the present invention will be described below with reference to the accompanying drawings.

[First Embodiment]

Figure 1:
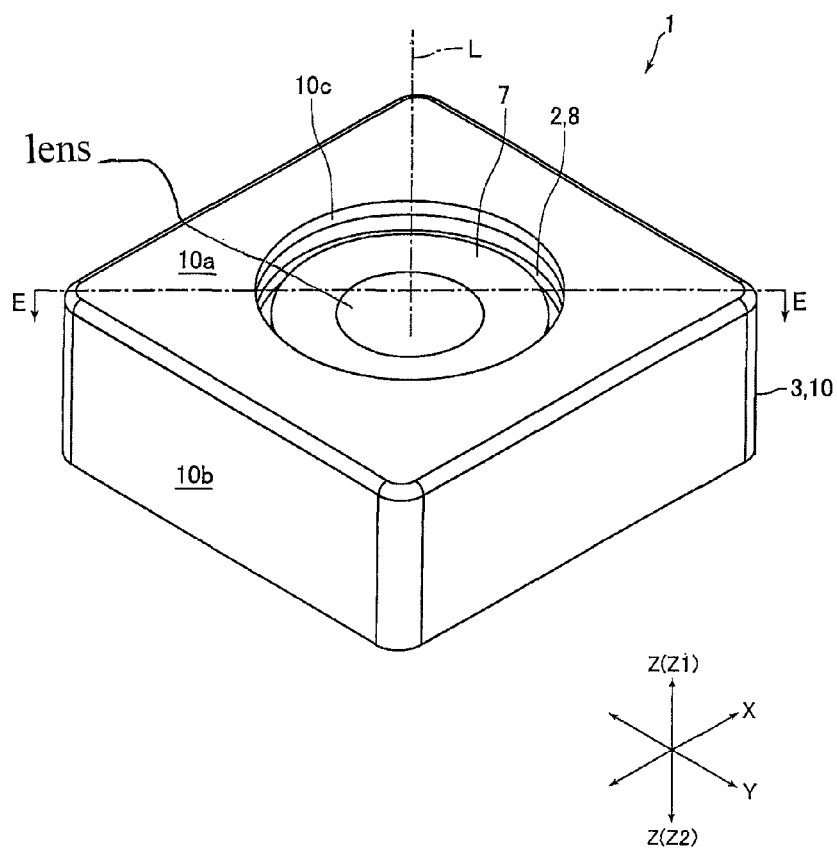
FIG. 1 is a perspective view showing an optical device in accordance with a first embodiment of the present invention.
Figure 2:
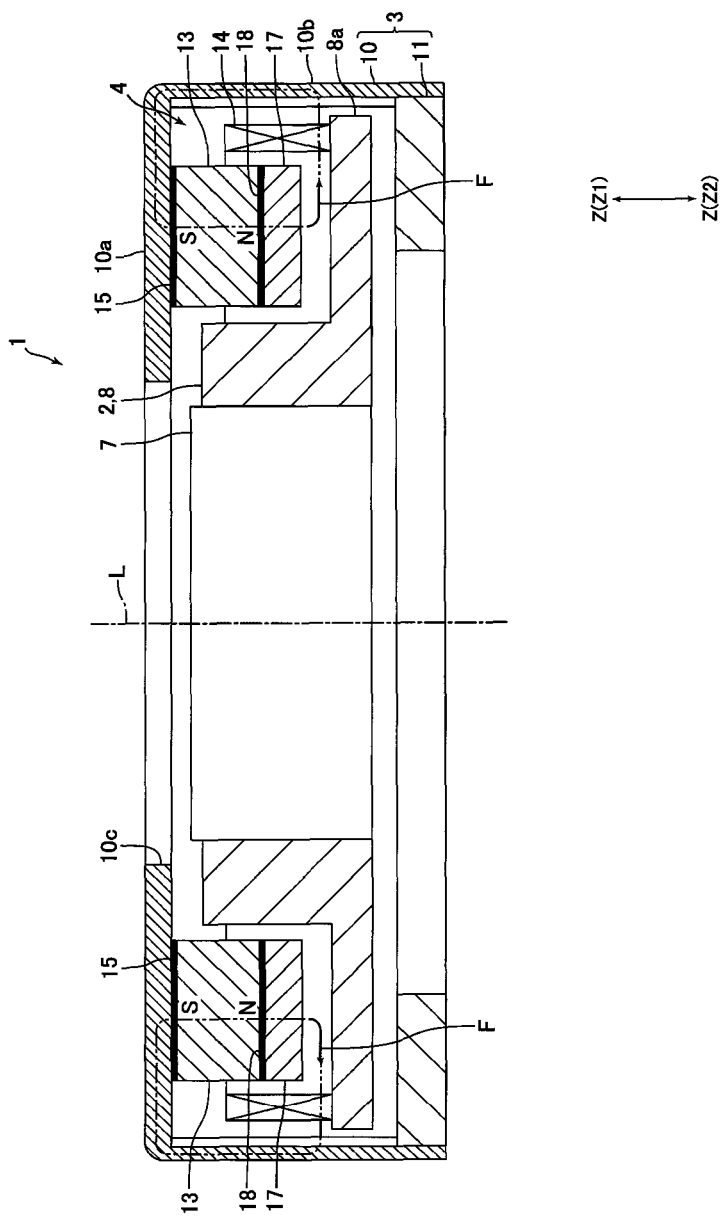
FIG. 2 is a cross-sectional view showing an "E-E" cross section of the optical device in FIG. 1.
Figure 3:
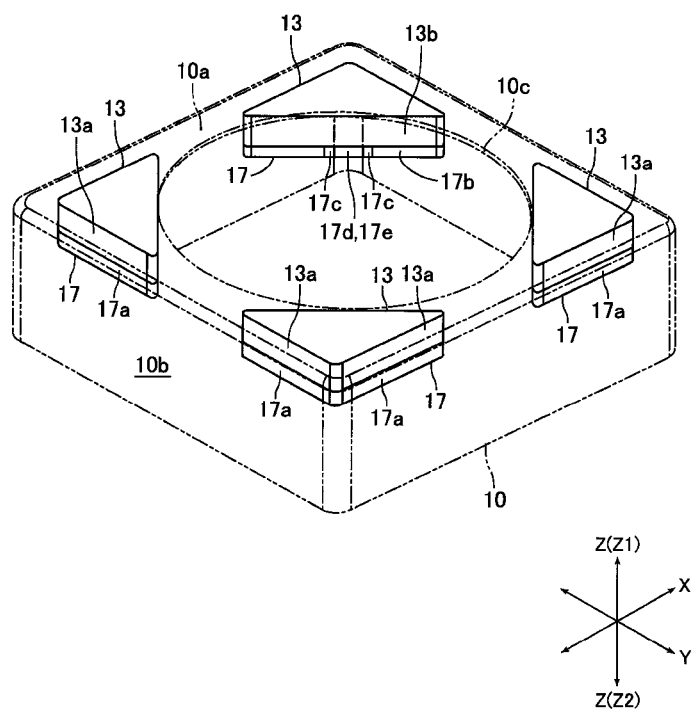
FIG. 3 is a perspective view showing a state where drive magnets are fixed to a cover member which is shown in FIG. 1.
Figure 4:
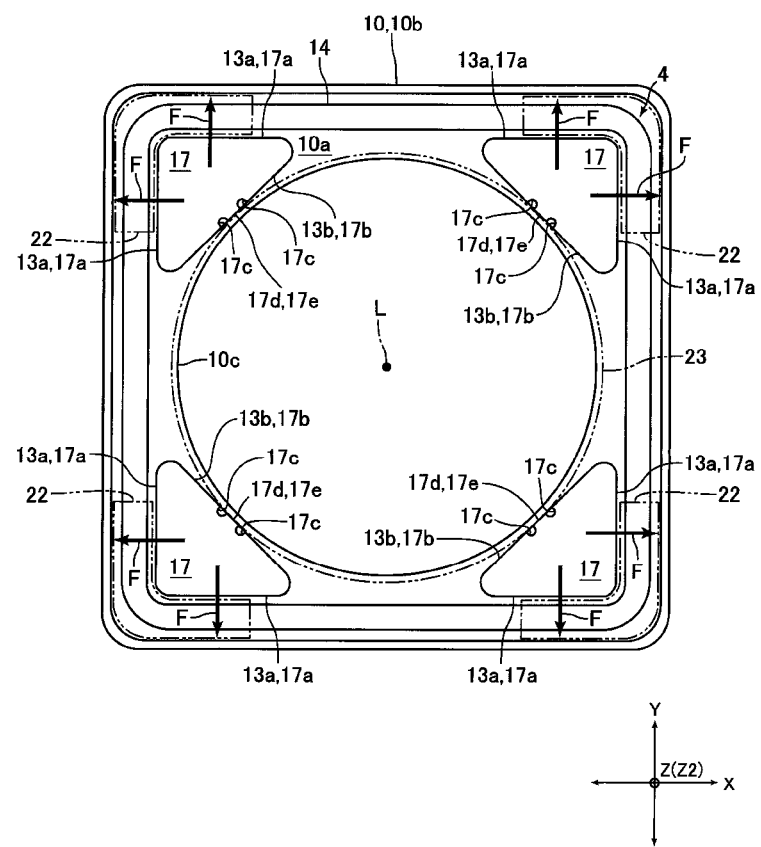
FIG. 4 is a view showing a state where a movable body, a base member and the like are detached from the optical device shown in FIG. 1 and which is viewed from an opposite-to-object side.

FIG. 1 is a perspective view showing an optical device 1 in accordance with a first embodiment of the present invention. FIG. 2 is a cross-sectional view showing an "E-E" cross section of the optical device 1 in FIG. 1. FIG. 3 is a perspective view showing a state where drive magnets 13 are fixed to a cover member 10 which is shown in FIG. 1. FIG. 4 is a view showing a state where a movable body 2, a base member 11 and the like are detached from the optical device 1 shown in FIG. 1 and which is viewed from an opposite-to-object side. In the first embodiment, as shown in FIG. 1 and the like, three directions perpendicular to each other are set to be an "X" direction, a "Y" direction and a "Z" direction and the "X" direction is set to be a right and left direction, the "Y" direction is a front and rear direction, and the "Z" direction is an up-and-down direction. Further, a "Z1" direction side in FIG. 1 is set to be an "upper" side and a "Z2" direction side is a "lower" side.

The optical device 1 in this embodiment is a lens drive device which is provided with a structure for moving a lens for photography in an optical axis direction to adjust a focus position for an optical image. The optical device 1 is mounted and used in a relatively small camera which is used in a cellular phone, a drive recorder, a monitoring camera system or the like. In the following description, the optical device 1 in this embodiment is referred to as a "lens drive device 1".

A lens drive device 1 is, as shown in FIG. 1, formed in a substantially rectangular prism shape as a whole. In other words, the lens drive device 1 is formed in a substantially rectangular shape when viewed in a direction of an optical axis "L" (optical axis direction) of a lens for photography. In this embodiment, the lens drive device 1 is formed in a substantially square shape when viewed in the optical axis direction. Further, four side faces of the lens drive device 1 are substantially parallel to the right and left direction or the front and rear direction.

In this embodiment, the "Z" direction (up-and-down direction) is substantially coincided with the optical axis direction. Further, in the camera on which the lens drive device 1 in this embodiment is mounted, an imaging element not shown is disposed on its lower side and an object to be photographed on an upper side is photographed. In other words, in this embodiment, the upper side ("Z1" direction side) is an object to be photographed side (object side) and the lower side ("Z2" direction side) is an opposite-to-object side (imaging element side and image side).

As shown in FIGS. 1 and 2, the lens drive device 1 is provided with a movable body 2, which holds a lens for photography and is movable in the optical axis direction, a fixed body 3 which movably holds the movable body 2 in the optical axis direction, and a drive mechanism 4 for driving the movable body 2 in the optical axis direction. The movable body 2 is movably held by the fixed body 3 through a plate spring not shown. The plate spring is, for example, structured of a movable body side fixed part which is fixed to the movable body 2, a fixed body side fixed part which is fixed to the fixed body 3, and a spring part which connects the movable body side fixed part with the fixed body side fixed part. The plate spring is disposed on an upper end side and a lower end side of the movable body 2.

The movable body 2 is provided with a sleeve 8 which holds a lens holder 7 to which a plurality of lenses are fixed. The fixed body 3 is provided with a cover member 10 which structures four side faces (outer peripheral face) of the lens drive device 1 and a base member 11 which structures an end face on an opposite-to-object side of the lens drive device 1.

The lens holder 7 is formed in a substantially cylindrical tube shape and a plurality of lenses are fixed to an inner peripheral side of the lens holder 7. The sleeve 8 is formed in a substantially tube-like shape and an outer peripheral face of the lens holder 7 is fixed to an inner peripheral face of the sleeve 8. Further, a flange part 8a is formed on a lower end side of the sleeve 8.

The cover member 10 is formed of magnetic material. The cover member 10 in this embodiment is formed of a thin steel plate having a magnetic property. a A nickel plating layer consisting of nickel or nickel alloy consisting mainly of nickel is formed on a surface of the cover member 10. The cover member 10 is formed in a substantially bottomed rectangular tube shape which is provided with a bottom part 10a and a tube part 10b. The bottom part 10a is disposed on an upper side and structures an end face on an object side of the lens drive device 1. A circular through hole 10c is formed at the center of the bottom part 10a. The cover member 10 is disposed so as to surround outer peripheral sides of the drive mechanism 4 and the movable body 2. The base member 11 is formed in a substantially square frame shape and is attached to a lower end side of the cover member 10.

The drive mechanism 4 is provided with four drive magnets 13, which are disposed at four corners of the lens drive device 1 (specifically, four corners on an inner side of the cover member 10) and are formed in a substantially triangular prism shape, and one drive coil 14 which is fixed to the sleeve 8.

The drive magnet 13 is a neodymium magnet containing neodymium, iron and boron as main components. The drive magnet 13 is formed so that its shape when viewed in the upper and lower direction is a substantially rectangular equilateral triangle. The drive magnet 13 is provided with two first rectangular side faces (first side faces) 13a which are substantially parallel to the optical axis "L" and are perpendicular to each other, and one second rectangular side face (second side face) 13b which is substantially parallel to the optical axis "L" for connecting two first side faces 13a with each other. A nickel plating layer for rust prevention consisting of nickel or nickel alloy consisting mainly of nickel is formed on the surface of the drive magnet 13.

The drive magnet 13 is disposed so that an inner peripheral face of the tube part 10b of the cover member 10 and the first side face 13a are substantially parallel to each other and are oppositely disposed to each other with a predetermined gap space therebetween. In other words, two drive magnets 13 which are disposed at diagonal positions on an inner side of the cover member 10 are disposed so that the second side faces 13b are oppositely disposed to each other. Further, the four drive magnets 13 are fixed to the bottom part 10a of the cover member 10. Specifically, upper end faces of the four drive magnets 13 are fixed to the under face of the bottom part 10a in an abutted state with the under face of the bottom part 10a. Further, the upper end faces of the four drive magnets 13 are completely covered by the bottom part 10a.

In this embodiment, the drive magnet 13 is joined to the bottom part 10a by a joining layer 15 consisting of tin-based metal containing at least tin. In other words, as shown in FIG. 2, the drive magnet 13 and the bottom part 10a are joined to each other by the joining layer 15 which is disposed between the under face of the bottom part 10a and the upper face of the drive magnet 13. The joining layer 15 is structured of tin, tin alloy containing copper, tin alloy containing gold, tin alloy containing silver, tin alloy containing bismuth or the like.

A lower end face of the drive magnet 13 is fixed with a flat plate-shaped magnetic member 17 which is formed of magnetic material. The magnetic member 17 in this embodiment is formed of a stainless steel sheet having a magnetic property. A surface of the magnetic member 17 is formed with a nickel plating layer which is consisting of nickel or nickel alloy consisting mainly of nickel and is easily metallic bonded with the tin metal plating.

The magnetic member 17 is formed so that, similarly to the drive magnet 13, its shape when viewed in the upper and lower direction is a substantially rectangular equilateral triangle. The magnetic member 17 is provided with two first end faces 17a which are perpendicular to each other and one second end face 17b which connects the two first end faces 17a with each other. The magnetic member 17 is fixed to a lower end face of the drive magnet 13 so that its thickness direction is substantially coincided with the upper and lower direction. Further, the magnetic member 17 is fixed to the lower end face of the drive magnet 13 so that the first end face 17a is disposed so as to form the same flat face with the first side face 13a of the drive magnet 13 and the second end face 17b is disposed so as to form the same flat face with the second side face 13b of the drive magnet 13.

In this embodiment, the magnetic member 17 is joined to the drive magnet 13 by a joining layer 18 consisting of tin-based metal containing at least tin. In other words, as shown in FIG. 2, the drive magnet 13 and the magnetic member 17 are joined to each other by the joining layer 18 which is disposed between an under face of the drive magnet 13 and an upper face of the magnetic member 17. The joining layer 18 is structured of tin-based metal which is similar to the tin-based metal structuring the joining layer 15. The joining layer 18 is structured of tin, tin alloy containing copper, tin alloy containing gold, tin alloy containing silver, tin alloy containing bismuth or the like.

The drive magnet 13 is magnetized in two poles in the upper and lower direction so that a magnetic pole of its upper end face and a magnetic pole of its lower end face are different from each other. For example, the upper end face of the drive magnet 13 is magnetized in an "S"-pole and the lower end face of the drive magnet 13 is magnetized in an "N"-pole. Further, the first side faces 13a of the drive magnet 13 and the first end faces 17a of the magnetic member 17 are covered by the tube part 10b of the cover member 10 from outer peripheral sides.

Therefore, as shown in FIG. 2, in the lens drive device 1, a magnetic field "F" is formed so as to pass through the tube part 10b and the bottom part 10a of the cover member 10, the drive magnet 13 and the magnetic member 17 and reach to the inner peripheral face of the tube part 10b from the under face and the first end faces 17a of the magnetic member 17. The magnetic field "F" is formed so as to pass from the under face and the first end face 17a of the magnetic member 17 toward a portion of the inner peripheral face of the tube part 10b which is oppositely disposed in substantially parallel to the first side face 13a of the drive magnet 13 and the first end face 17a of the magnetic member 17. In this embodiment, in FIG. 2, although not shown, the magnetic field "F" is also formed so as to reach to the inner peripheral face of the tube part 10b from a vicinity of an abutting portion of the lower end face of the drive magnet 13 with the upper face of the magnetic member 17.

The drive coil 14 is wound around in a substantially flat rectangular tube shape whose shape viewed in the upper and lower direction is a substantially square shape. A width of the drive coil 14 in the upper and lower direction is thicker than a thickness of the magnetic member 17. The drive coil 14 is fixed to an upper face of the flange part 8a of the sleeve 8 with an adhesion.

The drive coil 14 is, as shown in FIG. 4, disposed along the inner peripheral face of the tube part 10b of the cover member 10. Four corners and their vicinity portions of the drive coil 14 are disposed in spaces between the first side faces 13a of the drive magnets 13, the first end faces 17a of the magnetic members 17 and the tube part 10b of the cover member 10. In other words, the inner peripheral faces of the four corners and their vicinity portions of the drive coil 14 are oppositely disposed to the first side faces 13a of the drive magnets 13 and the first end faces 17a of the magnetic members 17 with a predetermined gap space therebetween in the front and rear direction or in the right and left direction. In other words, a part of the drive coil 14 is oppositely disposed to parts of the drive magnet 13 and the magnetic member 17 with a predetermined gap space therebetween so as to cover the parts of the drive magnet 13 and the magnetic member 17 from an outer peripheral side. Further, the inner peripheral face of the four corners and their vicinity portions of the drive coil 14 are also oppositely disposed to the joining layers 18 which are disposed between the under face of the drive magnet 13 and the upper face of the magnetic member 17 with the predetermined gap space therebetween in the front and rear direction or in the right and left direction (see FIG. 2). Further, the four corners and their vicinity portions of the drive coil 14 are disposed in the inside of the magnetic field "F" which is formed so as to reach to the inner peripheral face of the tube part 10b from the under face and the first end face 17a of the magnetic member 17.

In this embodiment, the drive coil 14 is disposed so that the magnetic member 17 is always disposed on the inner peripheral side of the drive coil 14 in a moving range of the movable body 2. In other words, in the moving range of the movable body 2, the drive coil 14 is disposed so that the lower end face of the drive coil 14 is not moved to an upper side with respect to the under face of the magnetic member 17 and the upper end face of the drive coil 14 is not moved to a lower side with respect to the upper face of the magnetic member 17. When an electric current is supplied to the drive coil 14, the movable body 2 is moved in the upper and lower direction (optical axis direction) through an operation between the drive magnets 13 and the drive coil 14. In other words, the drive magnet 13 and the drive coil 14 relatively move the movable body 2 in the optical axis direction with respect to the fixed body 3.

In this embodiment, the cover member 10 and the magnetic member 17 are a metal member which is fixed to the drive magnet 13. Further, the cover member 10 in this embodiment is a first metal member and the magnetic member 17 is a second metal member.

Figure 5:
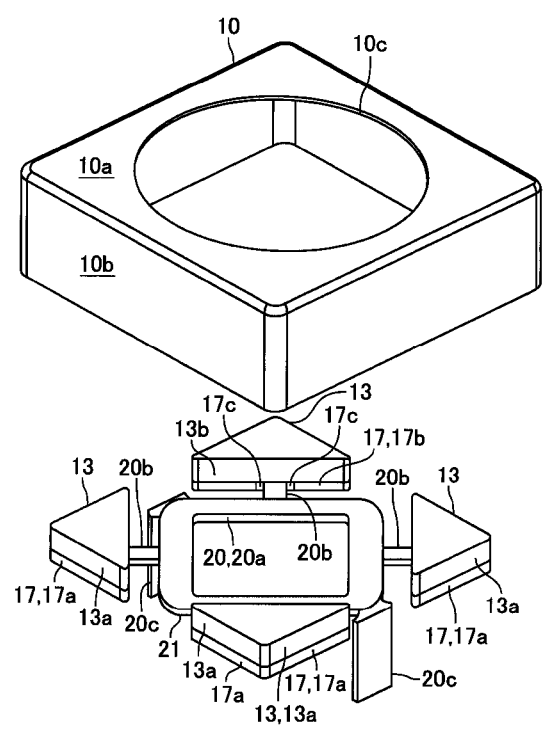
FIG. 5 is an exploded perspective view showing a state before the cover member, the drive magnets and a magnetic member connecting body shown in FIG. 3 are joined to each other.
Figure 6:
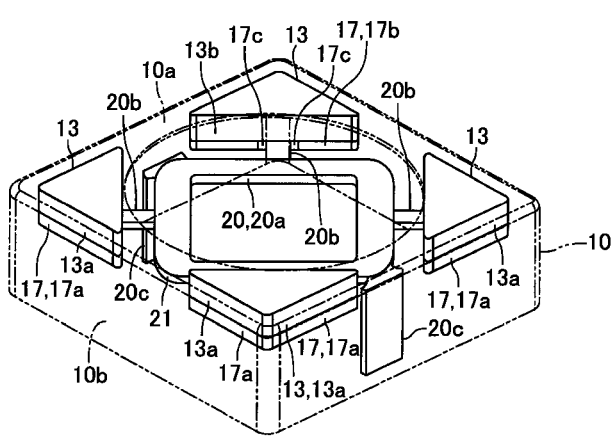
FIG. 6 is a perspective view showing a state after the cover member, the drive magnets and the magnetic member connecting body shown in FIG. 5 have been joined to each other.
Figure 7:
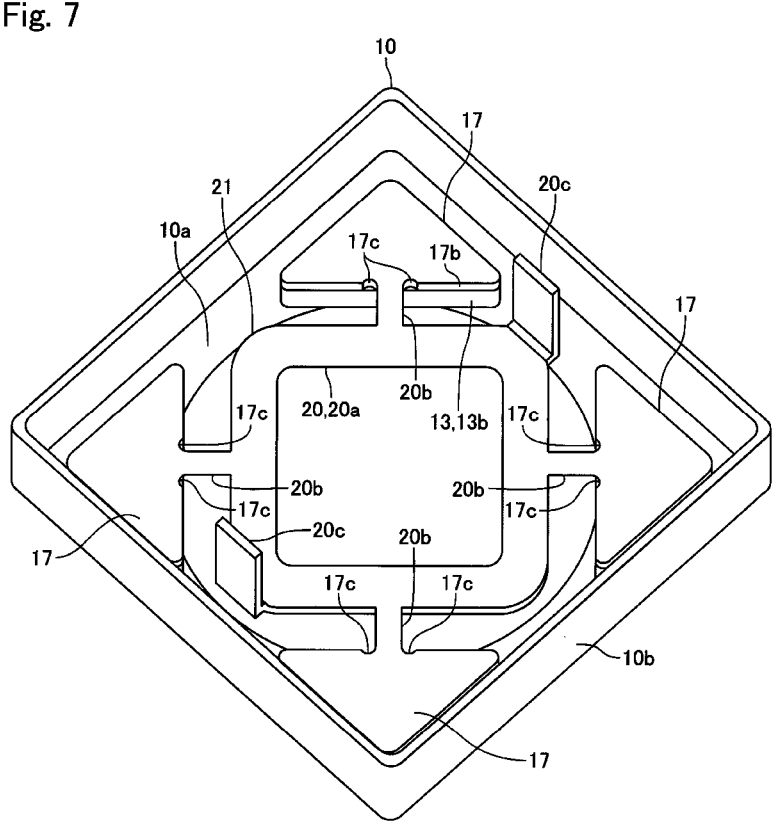
FIG. 7 is a perspective view showing a state after the cover member, the drive magnets and the magnetic member connecting body shown in FIG. 6 are joined to each other and which is viewed from an opposite-to-object side.

FIG. 5 is an exploded perspective view showing a state before the cover member 10, the drive magnets 13 and a magnetic member original body 21 shown in FIG. 3 are joined to each other. FIG. 6 is a perspective view showing a state after the cover member 10, the drive magnets 13 and the magnetic member original body 21 shown in FIG. 5 have been joined to each other. FIG. 7 is a perspective view showing a state after the cover member 10, the drive magnets 13 and the magnetic member original body 21 shown in FIG. 6 have been joined to each other and which is viewed from an opposite-to-object side.

Next, a joining method of the cover member 10, the drive magnets 13 and the magnetic members 17 will be described below.

A surface of the drive magnet 13 before joined to the cover member 10 and the magnetic member 17 is formed with tin plating layers, which become the joining layers 15 and 18 after having been joined, so as to cover the nickel plating layer. Further, the drive magnet 13 is not magnetized before joined to the cover member 10 and the magnetic member 17. In this embodiment, a tin plating layer is not formed so as to cover the nickel plating layer on the surface of the cover member 10 and the surface of the magnetic member 17 before joined to the drive magnet 13. However, a tin plating layer may be formed so as to cover the nickel plating layer on the cover member 10 and the magnetic member 17. In this case, when a tin plating layer is melted, the tin plating layer is discolored by induction heating described below. Therefore, it is preferable that a tin plating layer is not formed on the cover member 10 which structures the outer peripheral face of the lens drive device 1.

Further, the magnetic members 17 before joined to the drive magnets 13 are connected through a connecting member 20 for integrating four magnetic members 17 with each other. The four magnetic members 17 which are connected with each other through the connecting member 20 structure the magnetic member connecting body 21. The connecting member 20 is provided with a base part 20a which is formed in a roughly square frame shape and four substantially rectangular-shaped connecting parts 20b which are protruded to outer sides from substantially centers of respective four sides of the base part 20a. The base part 20a and the four magnetic members 17 are connected with each other through the connecting parts 20b. Both sides in a widthwise direction of the connecting part 20b at a boundary portion between the connecting part 20b and the magnetic member 17 are, as shown in FIG. 7, formed with a substantially semicircular arc-shaped cutout part 17c which is recessed from the second end face 17b toward the magnetic member 17. Further, a grasping part 20c is formed at two positions on a diagonal line of four corners of the base part 20a for handling the magnetic member connecting body 21 when the cover member 10, the drive magnets 13 and the magnetic members 17 are to be joined to each other or the like.

When the cover member 10, the drive magnets 13 and the magnetic members 17 are to be joined to each other, first, a magnetic member connecting body 21 is set into a recessed portion which is formed in a joining jig and the magnetic member connecting body 21 is positioned.

After that, the drive magnets 13 are set on the magnetic members 17 so that each of the four drive magnets 13 are pressed against each of four guide members 22 (see FIG. 4) which is formed in the joining jig. The guide member 22 is, as shown in FIG. 4, formed in a substantially "L"-shape. When the first side faces 13a of the drive magnet 13 are pressed against inner side faces of the guide member 22, the drive magnet 13 is set on the magnetic member 17 so that the first side faces 13a and the first end faces 17a of the magnetic member 17 are disposed so as to form the same flat face as each other and so that the second side face 13b of the drive magnet 13 and the second end face 17b of the magnetic member 17 are disposed so as to form the same flat face as each other. After that, a nesting 23 in a substantially cylindrical shape (see FIG. 4) which is formed so as to be abutted with the second side faces 13b of the four drive magnets 13 is set and the drive magnets 13 are positioned.

After that, the cover member 10 is placed so as to cover the drive magnets 13 and the magnetic member connecting body 21 so that the under face of the bottom part 10a of the cover member 10 and the upper end faces of the drive magnets 13 are abutted with each other and, in this manner, the cover member 10 is set. In this case, the inner peripheral face of the tube part 10b of the cover member 10 is guided by the outer side faces of the guide members 22 and the cover member 10 is positioned.

After that, the cover member 10, the drive magnets 13 and the magnetic member connecting body 21 are disposed in an induction coil. Further, an electric current is supplied to the induction coil while pressurizing and holding so that the cover member 10 and the drive magnets 13 are tightly contacted with each other and the drive magnets 13 and the magnetic member connecting body 21 are tightly contacted with each other. When an electric current is supplied to the induction coil, the cover member 10, the drive magnets 13 and the magnetic member connecting body 21 are heated by operations of eddy currents generated in the cover member 10, the drive magnets 13 and the magnetic member connecting body 21, the tin plating layers on the surfaces of the drive magnets 13 are melted. In other words, the tin plating layers on the surfaces of the drive magnets 13 are melted by induction heating. Further, when the supply of the electric current to the induction coil is stopped, the melted tin-based metal is solidified to form joining layers 15 and 18 and the cover member 10, the drive magnets 13 and the magnetic member connecting body 21 are joined to each other by the joining layers 15 and 18. In this embodiment, at the time of induction heating, the cover member 10, the drive magnets 13 and the magnetic member connecting body 21 are heated to about 230° C.(degree C.)-300° C.(degree C.).

After that, the connecting member 20 of the magnetic member connecting body 21 is removed. Specifically, boundary portions between the connecting parts 20b and the magnetic members 17 are cut off and the connecting member 20 is removed. The boundary portion between the connecting part 20b and the magnetic member 17 is, for example, disconnected by a mechanical cutting, a laser cutting or the like. When the connecting member 20 is removed, the magnetic member 17 is, as shown in FIG. 4, formed with a removing trace 17d. In this case, substantially semicircular arc-shaped cutout parts 17c which are recessed to the magnetic member 17 side from the second end face 17b are formed on both sides in a widthwise direction of the connecting part 20b at a boundary portion between the connecting part 20b and the magnetic member 17. Therefore, when the boundary portion between the connecting part 20b and the magnetic member 17 is cut and disconnected, a portion of the removing trace 17d can be formed so as not to protrude to an inner side (movable body 2 side) with respect to the second end face 17b. The removing trace 17d is formed at a tip end of a protruded part 17e whose base end part is connected with the magnetic member 17. In this embodiment, after the cover member 10, the drive magnets 13 and the magnetic members 17 are joined to each other, the four drive magnets 13 are simultaneously magnetized.

As described above, in this embodiment, the drive magnet 13 and the magnetic member 17 are joined to each other by the joining layer 18 which is formed so that the tin plating layers on the surfaces of the drive magnet 13 before joined to the cover member 10 and the magnetic member 17 are melted and solidified. Therefore, the joining layer 18 is not protruded from a portion between the drive magnet 13 and the magnetic member 17. Accordingly, in this embodiment, even when a gap space between the drive magnet 13 and the drive coil 14 is set to be narrow in order to prevent a drive force from being lowered due to downsizing of the drive magnet 13 and the drive coil 14, the gap space between the drive magnet 13, the magnetic member 17 and the joining layer 18 and the drive coil 14 is formed with a high degree of accuracy. As a result, an interference of the movable body 2 with the fixed body 3 is prevented. In other words, in this embodiment, even when the size of the lens drive device 1 is reduced by reducing the sizes of the drive magnet 13 and the drive coil 14 and by narrowing a gap space between the drive magnet 13 and the drive coil 14, an interference of the movable body 2 with the fixed body 3 is prevented and the movable body 2 is moved appropriately.

Further, in this embodiment, the joining layer 18 is not protruded from a portion between the drive magnet 13 and the magnetic member 17 and thus a gap space between the drive magnet 13, the magnetic member 17 and the joining layer 18 and the outer peripheral face of the sleeve 8 is formed with a high degree of accuracy. Therefore, an interference of the movable body 2 with the fixed body 3 is also prevented on the inner peripheral side of the drive magnet 13.

In this embodiment, the tin plating layers which are formed on the surfaces of the drive magnet 13 before joined to the cover member 10 and the magnetic member 17 are melted by induction heating. In other words, in this embodiment, the cover member 10, the drive magnets 13 and the magnetic member connecting body 21 are disposed in the induction coil and an electric current is supplied to the induction coil to melt the tin plating layer. Therefore, temperatures of the cover member 10, the drive magnets 13 and the magnetic member connecting body 21 when the tin plating layers are to be melted are made uniform and thus variation of joining strengths of the cover member 10 to the drive magnets 13 and variation of joining strengths of the drive magnets 13 to the magnetic member connecting body 21 can be prevented. Further, in this embodiment, the tin plating layer can be melted without contacting the cover member 10, the drive magnets 13 and the magnetic member connecting body 21 with the induction coil. Therefore, relative positional displacement of the cover member 10, the drive magnets 13 and the magnetic member connecting body 21 from each other is prevented when the tin plating layers are to be melted.

In this embodiment, in a state that the drive magnet 13 is sandwiched between the bottom part 10a of the cover member 10 and the magnetic member connecting body 21, the tin plating layers on the surfaces of the drive magnet 13 are melted and solidified to form the joining layers 15 and 18. Therefore, the cover member 10, the drive magnets 13 and the magnetic member connecting body 21 are fixed to each other by one operation. Accordingly, in this embodiment, a fixing operation of the cover member 10, the drive magnets 13 and the magnetic member connecting body 21 to each other is easily performed.

In this embodiment, the four magnetic members 17 before joined to the drive magnets 13 are connected and integrated with each other by the connecting member 20. Therefore, a relative positional accuracy of the four magnetic members 17 to each other when joined to the drive magnets 13 is enhanced and, as a result, in the lens drive device 1 after having been assembled, a relative positional accuracy of the four magnetic members 17 is enhanced.

In this embodiment, the cover member 10, the drive magnet 13 and the magnetic member 17 are joined to each other by the joining layers 15 and 18 consisting of tin-based metal. Therefore, in comparison with a case that the cover member 10, the drive magnet 13 and the magnetic member 17 are joined to each other with an adhesive, loss of magnetic flux passing through the cover member 10, the drive magnet 13 and the magnetic member 17 is reduced. Accordingly, in this embodiment, a magnetic circuit having a satisfactory efficiency can be formed. Further, in comparison with a case that the cover member 10, the drive magnet 13 and the magnetic member 17 are joined to each other with an adhesive, in this embodiment, a time for joining can be shortened.

FIGS. 8(A) through 8(D) are plan views showing magnetic member connecting bodies 31, 33, 35 and 37 in accordance with another embodiment of the present invention.

Figure 8A:
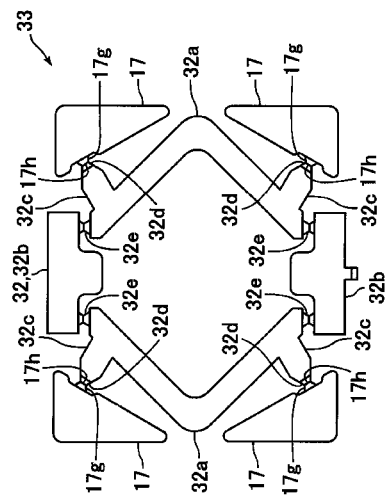
FIGS. 8(A) through 8(D) are plan views showing a magnetic member connecting body in accordance with another embodiment of the present invention.
Figure 8B:
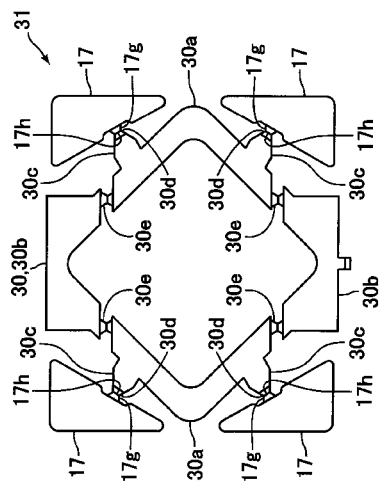

In the embodiment described above, four magnetic members 17 are integrated with each other by the connecting member 20 which is provided with the base part 20a formed in a roughly square frame shape and four substantially rectangular-shaped connecting parts 20b which are protruded to outer sides from respective substantially center portions of four sides of the base part 20a and, in this manner, the magnetic member connecting body 21 is structured. However, the present invention is not limited to this embodiment. For example, as shown in FIG. 8(A), four magnetic members 17 may be integrated with each other by a connecting member 30 which is provided with two first base parts 30a formed in a substantially "V"-shape, two second base parts 30b which connect the two first base parts 30a with each other, and connecting parts 30c which are protruded to outer sides from the first base parts 30a and, in this manner, the magnetic member connecting body 31 is structured. Further, as shown in FIG. 8(B), four magnetic members 17 may be integrated with each other by a connecting member 32 which is provided with two first base parts 32a formed in a substantially "V"-shape, two second base parts 32b which connect the two first base parts 32a with each other, and connecting parts 32c which are protruded to outer sides from the first base parts 32a and, in this manner, the magnetic member connecting body 33 is structured.

In the connecting members 30 or 32, two connecting parts 30c or 32c are formed in the one first base part 30a or 32a and one first base part 30a or 32a and two magnetic members 17 are connected with each other by the connecting parts 30c or 32c. A boundary part 30d which is used as a cutting-off part is formed between the connecting part 30c and the magnetic member 17, and a boundary part 30e which is used as a cutting-off part is formed between the first base part 30a and the second base part 30b. A boundary part 32d is formed between the connecting part 32c and the magnetic member 17 and a boundary part 32e is formed between the first base part 32a and the second base part 32b. The boundary parts 30d, 30e, 32d and 32e are formed so that their widths become narrow and their thicknesses become thin toward their centers.

In the cases of the magnetic member connecting bodies 31 and 33, after the cover member 10, the drive magnets 13 and the magnetic member connecting body 31 or 33 have been joined to each other, the boundary parts 30d, 30e, 32d and 32e are, for example, bent repeatedly for disconnection and the connecting members 30 and 32 are removed. Specifically, first, the boundary parts 30e and 32e are cut off to remove the second base parts 30b and 32b and, after that, the boundary parts 30d and 32d are cut off to remove the first base parts 30a and 32a. In these cases, the boundary parts 30d, 30e, 32d and 32e are disconnected at center positions of the boundary parts 30d, 30e, 32d and 32e where the width is narrow and the thickness is thin.

The magnetic members 17 after the connecting members 30 and 32 have been removed are formed with protruded parts 17g which structure parts of the boundary parts 30d and 32d. In this case, since the protruded part 17g is formed in a recessed part which is formed in a side face of the magnetic member 17, the protruded part 17g does not protrude to the movable body 2 side from the side face of the magnetic member 17. A tip end of the protruded part 17g is a removing trace 17h which is formed when the connecting members 30 and 32 are removed. A width of the removing trace 17h is narrower than a width of the base end of the protruded part 17g and a thickness of the removing trace 17h is thinner than a thickness of the base end of the protruded part 17g. However, according to conditions when the connecting members 30 and 32 are removed, a thickness of the removing trace 17h may be thicker than a thickness of the base end of the protruded part 17g.

Figure 8C:
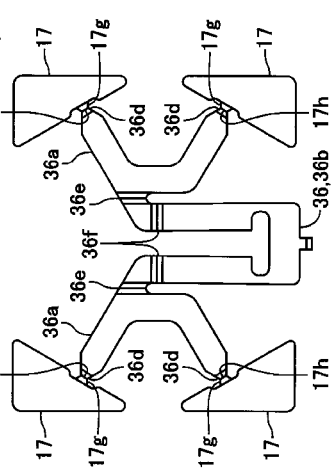
Figure 8D:
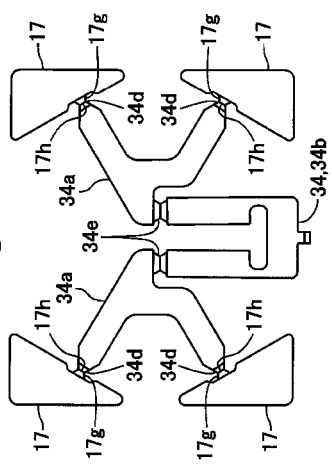

Further, as shown in FIG. 8(C), four magnetic members 17 may be integrated with each other by a connecting member 34 which is provided with two first base parts 34a formed in a roughly "V"-shape and one second base part 34b which connects the two first base parts 34a with each other and, in this manner, a magnetic member connecting body 35 is structured. Further, as shown in FIG. 8(D), four magnetic members 17 may be integrated with each other by a connecting member 36 which is provided with two first base parts 36a formed in a roughly "V"-shape and one second base part 36b which connects the two first base parts 36a with each other and, in this manner, a magnetic member connecting body 37 is structured.

In the connecting member 34 or 36, two magnetic members 17 are connected with one first base part 34a or 36a. A boundary part 34d is formed between the first base part 34a and the magnetic member 17 and a boundary part 34e is formed between the first base part 34a and the second base part 34b. A boundary part 36d is formed between the first base part 36a and the magnetic member 17 and a boundary part 36e is formed between the first base part 36a and the second base part 36b. Further, the second base part 36b is formed with bending parts 36f for bending the second base part 36b. The boundary parts 34d, 34e and 36d are formed so that their widths become narrow and their thicknesses become thin toward their centers. The boundary part 36e and the bending part 36f are formed so that their thicknesses become thin toward their centers.

In a case of the magnetic member connecting body 35, after the cover member 10, the drive magnets 13 and the magnetic member connecting body 35 have been joined to each other, the boundary parts 34d are, for example, bent repeatedly for disconnection and the connecting member 34 is removed. Specifically, first, the boundary parts 34e are bent and, while grasping the second base part 34b, the boundary parts 34d are bent repeatedly for disconnection to remove the connecting member 34. In this case, the boundary part 34d is cut off at a center position of the boundary part 34d where the width is narrow and the thickness is thin.

Further, in a case of the magnetic member connecting body 37, after the cover member 10, the drive magnets 13 and the magnetic member connecting body 37 have been joined with each other, the boundary parts 36d are, for example, bent repeatedly for disconnection and the connecting member 36 is removed. Specifically, first, the bending parts 36f are bent and, while grasping the second base part 36b, the boundary parts 36d are bent repeatedly for disconnection to remove the connecting member 36. In this case, the boundary part 36d is disconnected at a center position of the boundary part 36d where the width is narrow and the thickness is thin.

The magnetic members 17 after the connecting members 34 and 36 have been removed are, similarly to the magnetic members 17 after the connecting members 30 and 32 have been removed, formed with protruded parts 17g which structure parts of the boundary parts 34d and 36d. A tip end of the protruded part 17g is a removing trace 17h which is formed when the connecting members 34 and 36 have been removed. A width of the removing trace 17h is narrower than a width of a base end of the protruded part 17g and a thickness of the removing trace 17h is thinner than a thickness of the base end of the protruded part 17g. However, according to conditions when the connecting members 30 and 32 are removed, a thickness of the removing trace 17h may be thicker than a thickness of the base end of the protruded part 17g.

In the magnetic member connecting bodies 31, 33, 35 and 37, the boundary parts 30d, 32d, 34d and 36d are formed so that their widths become narrow and their thicknesses become thin toward their centers. Therefore, the connecting members 30, 32, 34 and 36 are easily removed from the magnetic member connecting bodies 31, 33, 35 and 37. Accordingly, when the connecting members 30, 32, 34 and 36 are to be removed from the magnetic member connecting bodies 31, 33, 35 and 37, the fixed positions of the magnetic members 17 which are fixed to the drive magnets 13 are prevented from being displaced. In accordance with an embodiment of the present invention, even when the boundary parts 30d, 32d, 34d and 36d are formed so that their thicknesses are constant and their widths become narrow toward their centers or, even when the boundary parts 30d, 32d, 34d and 36d are formed so that their widths are constant and their thicknesses become thin toward their centers, this effect can be obtained.

In the first embodiment, the magnetic members 17 before joined to the drive magnets 13 are connected by the connecting member 20. However, the magnetic members 17 before joined to the drive magnets 13 may not be connected by the connecting member 20. In other words, when the cover member 10, the drive magnets 13 and the magnetic members 17 are to be joined to each other, four separated magnetic members 17 may be set in a joining jig.

In the first embodiment, the drive mechanism 4 is provided with one drive coil 14 which is disposed along the inner peripheral face of the tube part 10b of the cover member 10. However, the drive mechanism 4 may be provided, instead of the drive coil 14, with four drive coils each of which is wound in a substantially triangular tube-like shape and whose inner peripheral side is oppositely disposed to a side face of the drive magnet 13 with a predetermined gap space. In this case, the drive coil is wound around so that a shape when viewed in the upper and lower direction is a substantially rectangular equilateral triangular shape and the drive coil is fixed to the sleeve 8 so that the inner peripheral face of the drive coil and the side face of the drive magnet 13 are substantially parallel to each other with a predetermined gap space therebetween.

In the first embodiment, the drive magnet 13 is formed in a substantially triangular prism shape. However, the drive magnet 13 may be formed in a substantially polygonal pillar shape other than a substantially triangular prism shape, a substantially cylindrical pillar shape or a substantially elliptic pillar shape. Further, in the first embodiment, the lens drive device 1 is formed so that a shape when viewed in the optical axis direction is a substantially quadrangular shape. However, the lens drive device 1 may be formed so that a shape when viewed in the optical axis direction is a roughly polygonal shape other than a substantially rectangular shape or a shape when viewed in the optical axis direction is a roughly circular shape or a roughly elliptic shape.

In the first embodiment, the shape of the drive magnet 13 and the shape of the magnetic member 17 when viewed in the upper and lower direction are substantially same as each other. However, the shape of the drive magnet 13 and the shape of the magnetic member 17 when viewed in the upper and lower direction may be different from each other. Further, in the first embodiment, the drive magnet 13 is disposed at four corners of the lens drive device 1. However, when a sufficient drive force for the movable body 2 is obtained, the drive magnet 13 may be disposed at three positions, two positions or only one position of four corners of the lens drive device 1.

[Second Embodiment]

Figure 9:
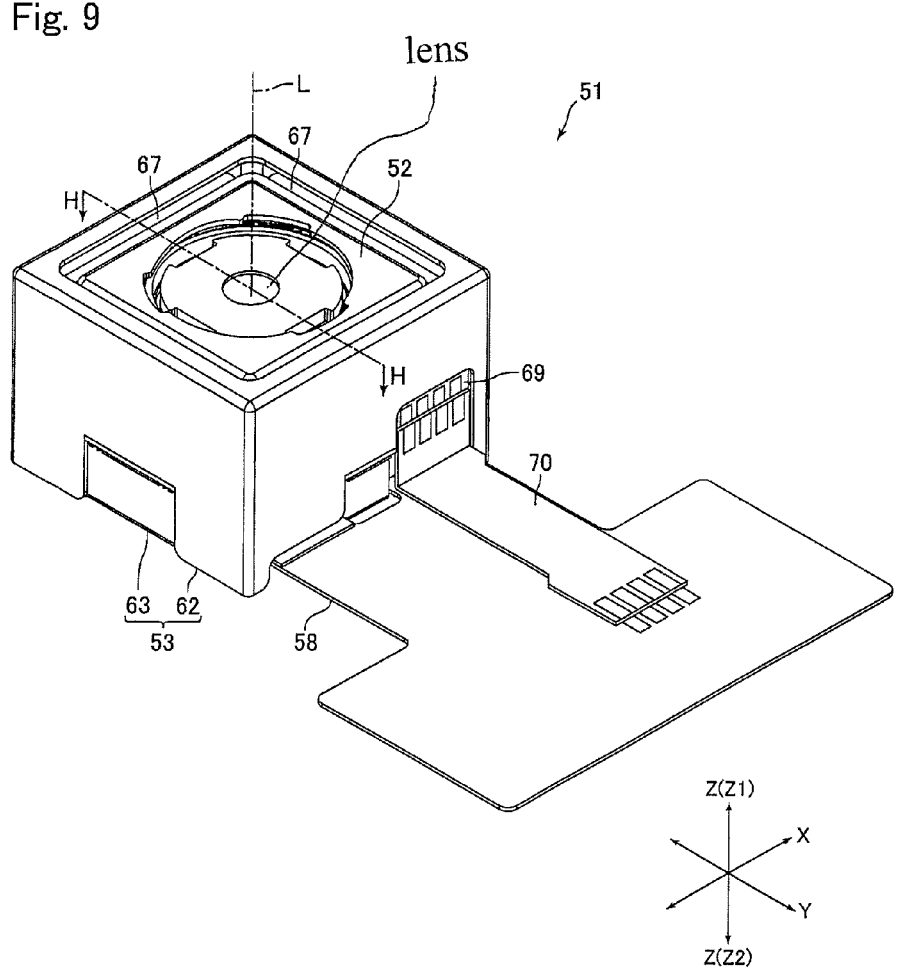
FIG. 9 is a perspective view showing an optical device in accordance with a second embodiment of the present invention.
Figure 10:
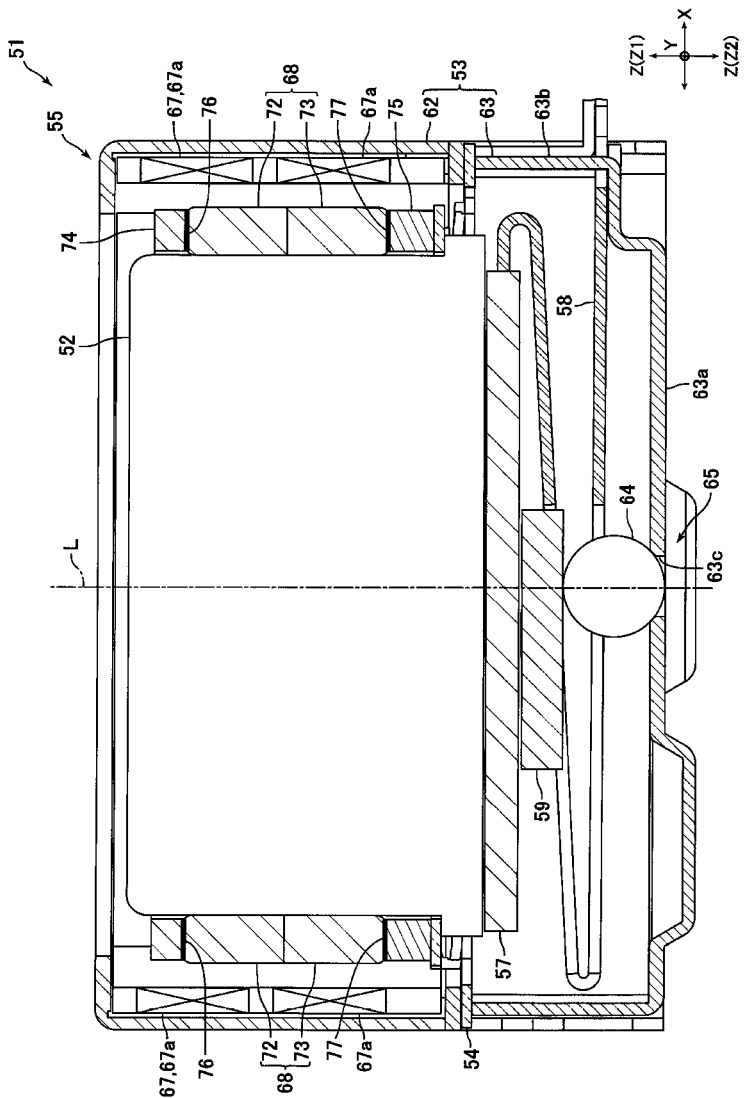
FIG. 10 is a cross-sectional view showing an "H-H" cross section of the optical device in FIG. 9.
Figure 11:
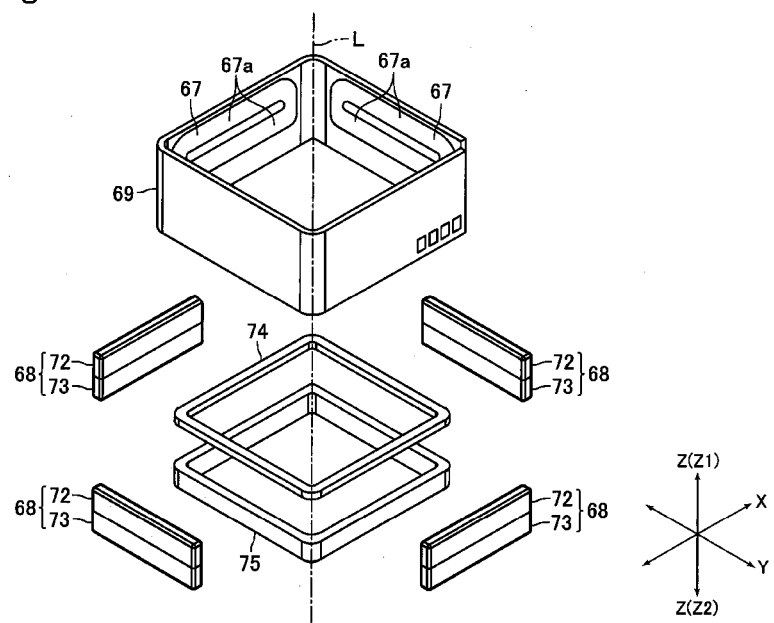
FIG. 11 is an exploded perspective view showing drive coils, drive magnets, magnet connecting members and the like shown in FIG. 10.
Figure 12:
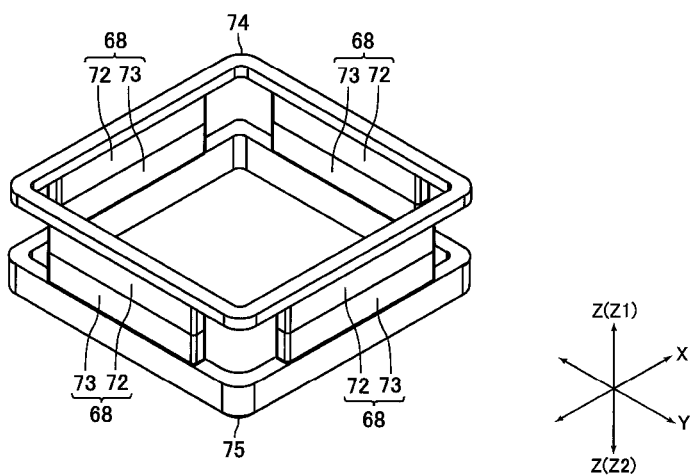
FIG. 12 is a perspective view showing a state where the magnet connecting members are fixed to the drive magnets shown in FIG. 11.
Figure 13:
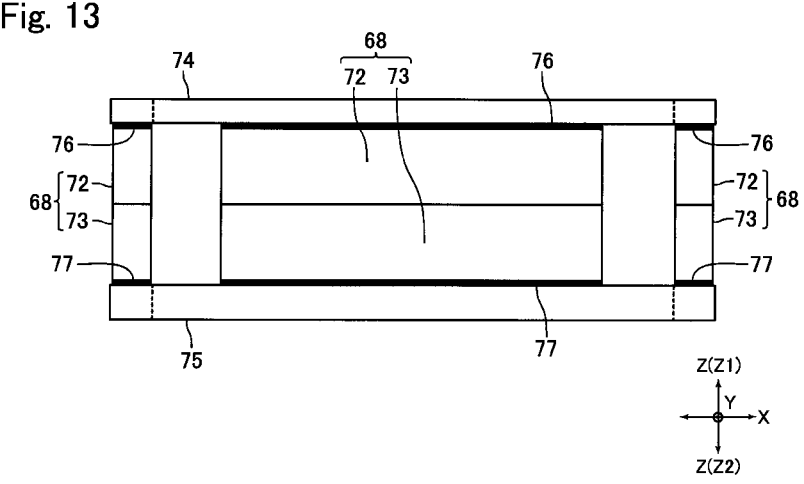
FIG. 13 is a side view showing the drive magnets and the magnet connecting members shown in FIG. 12.
Figure 14:
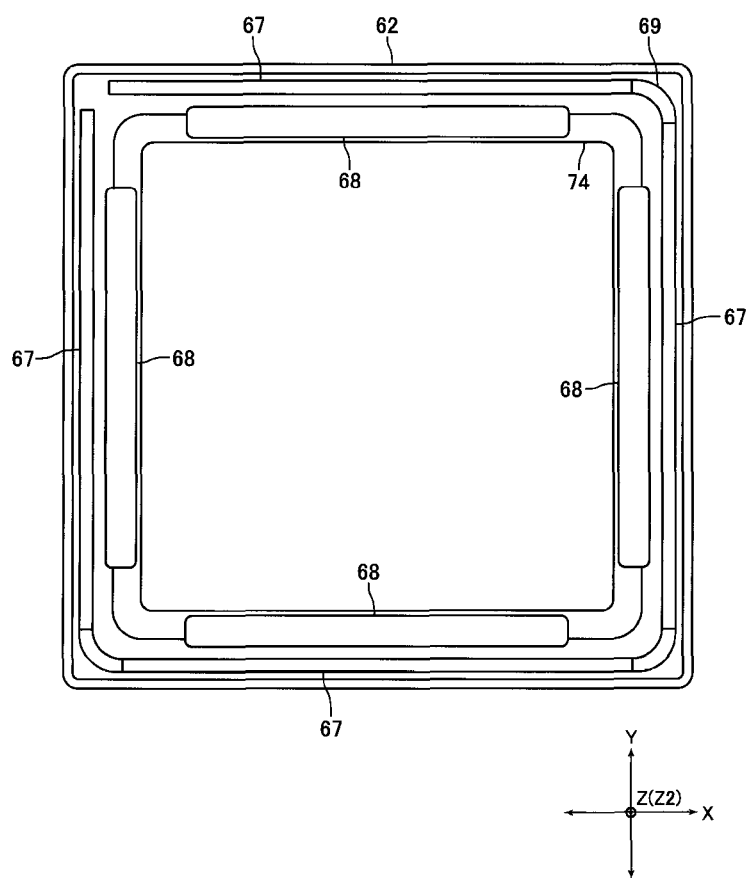
FIG. 14 is a view showing a case body, the drive coils, the drive magnets, the magnet connecting member and the like shown in FIG. 10 which are viewed from an opposite-to-object side.

FIG. 9 is a perspective view showing an optical device 51 in accordance with a second embodiment of the present invention. FIG. 10 is a cross-sectional view showing an "H-H" cross section of the optical device 51 in FIG. 9. FIG. 11 is an exploded perspective view showing drive coils 67, drive magnets 68, magnet connecting members 74 and 75 and the like shown in FIG. 10. FIG. 12 is a perspective view showing a state where the magnet connecting members 74 and 75 are fixed to the drive magnets 68 shown in FIG. 11. FIG. 13 is a side view showing the drive magnets 68 and the magnet connecting members 74 and 75 shown in FIG. 12. FIG. 14 is a view showing a case body 62, the drive coils 67, the drive magnets 68, the magnet connecting member 74 and the like shown in FIG. 10 which are viewed from an opposite-to-object side. In the second embodiment, as shown in FIG. 9, three directions perpendicular to each other are set to be an "X" direction, a "Y" direction and a "Z" direction and the "X" direction is set to be a right and left direction, the "Y" direction is a front and rear direction, and the "Z" direction is an upper-and-lower direction. Further, a "Z1" direction side is set to be an "upper" side and a "Z2" direction side is a "lower" side.

The optical device 51 in this embodiment is a small and thin camera which is mounted on a portable apparatus such as a cellular phone, a drive recorder, a monitoring camera system or the like and which is provided with an autofocus function and a shake correcting function. The optical device 51 is formed in a substantially rectangular prism-like shape as a whole. In this embodiment, the optical device 51 is formed so that a shape when viewed in a direction of an optical axis "L" of a lens for photography (optical axis direction) is a substantially square shape and four side faces of the optical device 51 are substantially parallel to the right and left direction or the front and rear direction.

The optical device 51 is, as shown in FIGS. 9 and 10, provided with a camera module 52 as a movable body which holds a lens and an imaging element, a fixed body 53 which swingably holds the camera module 52 so that the optical axis "L" is inclined, a plate spring 54 which connects the camera module 52 with the fixed body 53, and a swing drive mechanism 55 which swings the camera module 52 with respect to the fixed body 53 for correcting a shake of an optical image that is imaged on an imaging element. In this embodiment, the upper and lower direction is substantially coincided with an optical axis direction of the camera module 52 when the camera module 52 is not swung. Further, in this embodiment, an imaging element is mounted on a lower end of the camera module 52 for photographing an object to be photographed which is disposed on an upper side. In other words, in this embodiment, an upper side ("Z1" direction side) is an object to be photographed side (object side) and a lower side ("Z2" direction side) is an opposite-to-object side (imaging element side and image side).

The camera module 52 is formed in a substantially rectangular prism-like shape as a whole. In this embodiment, the camera module 52 is formed so that a shape when viewed in the optical axis direction is a substantially square shape. The camera module 52 is provided with a movable body, which holds a lens and is movable in the optical axis direction, a holding body which movably holds the movable body in the optical axis direction, and a drive mechanism for driving the movable body in the optical axis direction with respect to the holding body. The lens drive mechanism is, for example, structured of drive coils and drive magnets. In accordance with an embodiment of the present invention, the lens drive mechanism may be structured of a piezoelectric element, a shape-memory alloy or the like.

A board 57 is fixed to an under face of the camera module 52. An imaging element is mounted on the board 57. Further, the board 57 is mounted with a gyroscope for detecting a variation of an inclination of the camera module 52. An FPC (flexible printed circuit board) 58 is connected with the board 57. The FPC 58 is extended along a lower end side of the optical device 51 and is drawn out from a side face of the optical device 51. Further, an under face of the board 57 is, as shown in FIG. 10, fixed with an abutting plate 59 which is abutted with a spherical member 64 described below.

The fixed body 53 is provided with a case body 62, which structures four front, rear, right and left side faces (outer peripheral face) of the optical device 51, and a lower case body 63 which structures an under face side of the optical device 51. The case body 62 is formed in a substantially rectangular tube shape and is disposed so as to surround the camera module 52 from an outer peripheral side. The lower case body 63 is formed in a substantially rectangular tube shape with a bottom (substantially bottomed rectangular tube shape) which is provided with a bottom part 63a and a tube part 63b.

The bottom part 63a of the lower case body 63 is disposed on a lower side and structures an under face of the optical device 51. Further, a center of the bottom part 63a is formed with an arrangement hole 63c to which a lower end side of the spherical member 64 serving as a supporting point for swinging of the camera module 52 is disposed. In this embodiment, a supporting point part 65 which is a swing center of the camera module 52 is structured of the spherical member 64 and the arrangement hole 63c. The supporting point part 65 is disposed on a lower side of the camera module 52 and an upper end of the spherical member 64 is abutted with an under face of the abutting plate 59.

The swing drive mechanism 55 is provided with four drive coils 67 and four drive magnets 68 each of which is oppositely disposed to each of the four drive coils 67.

The four drive coils 67 are, as shown in FIG. 11, pattern coils which are formed in the FPC 69 in itself. Further, the drive coil 67 is formed to be wound around in a roughly rectangular shape and is provided with two long side parts 67a which are substantially parallel to each other. The FPC 69 is disposed along an inner peripheral face of the case body 62 so that each of the four drive coils 67 is disposed on each of four inner side faces which structures the inner peripheral face of the case body 62. Further, the FPC 69 is fixed to the inner peripheral face of the case body 62 so that the long side parts 67a are substantially parallel to the front and rear direction or the right and left direction. The FPC 69 is connected with the FPC 58 through a relaying FPC 70. In accordance with an embodiment of the present invention, the drive coil 67 may be an air-core coil which is wound around in an air-core shape. In this case, the drive coil 67 may be fixed to each of the inner side faces of the case body 62 or four drive coils 67 may be mounted on the FPC 69.

The drive magnet 68 is a neodymium magnet containing neodymium, iron and boron as main components. The drive magnet 68 is formed in a substantially rectangular flat plate shape. Further, the drive magnet 68 is structured of two magnet pieces which are a magnet piece 72 and a magnet piece 73 formed in a substantially rectangular flat plate shape. Specifically, the magnet piece 72 and the magnet piece 73 are adhesively fixed to each other in a state that an under face of the magnet piece 72 and an upper face of the magnet piece 73 are abutted with each other to form the drive magnet 68. A nickel plating layer consisting of nickel or nickel alloy consisting mainly of nickel is formed on the surface of the drive magnet 13.

The magnet connecting member 74 which is formed in a substantially square frame shape is fixed to upper faces of the four drive magnets 68 and the magnet connecting member 75 which is formed in a substantially square frame shape is fixed to under faces of the four drive magnets 68. The magnet connecting members 74 and 75 are formed of a stainless-steel plate. A nickel plating layer consisting of nickel or nickel alloy consisting mainly of nickel is formed on the surfaces of the magnet connecting members 74 and 75.

In this embodiment, the drive magnets 68 and the magnet connecting member 74 are joined to each other by joining layers 76 consisting of tin-based metal containing at least tin. Similarly, the drive magnets 68 and the magnet connecting member 75 are joined to each other by joining layers 77 consisting of tin-based metal containing at least tin. In other words, as shown in FIGS. 10 and 13, the drive magnets 68 and the magnet connecting member 74 are joined to each other by the joining layers 76 which are disposed between the under face of the magnet connecting member 74 and the upper faces of the drive magnets 68. Further, the drive magnets 68 and the magnet connecting member 75 are joined to each other by the joining layers 77 which are disposed between the upper face of the magnet connecting member 75 and the under faces of the drive magnets 68. The joining layers 76 and 77 are structured of tin, tin alloy containing copper, tin alloy containing gold, tin alloy containing silver, tin alloy containing bismuth or the like.

The magnet connecting members 74 and 75 in this embodiment are a metal member which is fixed to the drive magnets 68. Further, one of the magnet connecting members 74 and 75 is a first metal member and the other of the magnet connecting members 74 and 75 is a second metal member.

The four drive magnets 68 are fixed to the respective four outer side faces structuring the outer peripheral face of the camera module 52 and are disposed on an inner peripheral side of the case body 62 with respect to the drive coils 67. In this embodiment, after the four drive magnets 68 and the magnet connecting members 74 and 75 have been joined to each other and the four drive magnets 68 have been connected with each other by the magnet connecting members 74 and 75, the four drive magnets 68 are fixed to the outer side face of the camera module 52.

The magnet piece 72 is magnetized so that a magnetic pole formed on one side face and a magnetic pole formed on the other side face are different from each other. In other words, the magnet pieces 72 are magnetized so that the magnetic poles formed on the front, rear, right and left inner side faces which are fixed to the camera module 52 are different from the magnetic poles formed on the front, rear, right and left outer side faces which face the drive coils 67. Similarly, the magnet pieces 73 are magnetized so that the magnetic poles formed on the front, rear, right and left inner side faces which are fixed to the camera module 52 are different from the magnetic poles formed on the front, rear, right and left outer side faces which face the drive coils 67. Further, the magnet pieces 72 and 73 are magnetized so that the magnetic pole of the inner side face of the magnet piece 72 is different from the magnetic pole of the inner side face of the magnet piece 73. In other words, the magnet pieces 72 and 73 are magnetized so that the magnetic pole of the outer side face of the magnet piece 72 is different from the magnetic pole of the outer side face of the magnet piece 73.

As described above, the drive coils 67 are disposed along the inner peripheral face of the case body 62 and, as shown in FIG. 14, are disposed in gap spaces between the drive magnets 68 fixed to the outer side face of the camera module 52 and the inner peripheral face of the case body 62. In other words, the drive coils 67 face the drive magnets 68 through predetermined gap spaces in the front and rear direction or in the right and left direction. Further, the drive coils 67 also face the joining layers 76 and 77 through predetermined gap spaces in the front and rear direction or in the right and left direction (see FIG. 10).

A plate spring 54 is provided with a movable side fixed part which is fixed to the magnet connecting member 75, a fixed side fixed part which is fixed to the fixed body 53, and a plurality of spring parts which connect the movable side fixed part with the fixed side fixed part. In this embodiment, the camera module 52 which is fixed to the movable side fixed part through the magnet connecting member 75, the drive magnets 68 and the like is capable of being swung by resiliently bending of the spring parts with respect to the fixed side fixed part. Further, the plate spring 54 is fixed in a resiliently bent state so that the upper end of the spherical member 64 and the abutting plate 59 are surely abutted with each other and so that pressurization is generated for surely abutting the lower end side of the spherical member 64 with an edge of the arrangement hole 63c of the lower case body 63 (in other words, so that an urging force for urging the camera module 52 to the lower direction is generated).

In the optical device 51 structured as described above, when a variation of inclination of the camera module 52 is detected by a gyroscope which is mounted on the board 57, an electric current is supplied to the drive coils 67 based on a detection result of the gyroscope. When an electric current is supplied to the drive coils 67, the camera module 52 is swung so that the optical axis "L" is inclined with the supporting point part 65 as a swing center around the front and rear direction and/or around the right and left direction to correct a shake.

A surface of the drive magnet 68 before joined to the magnet connecting members 74 and 75 is formed with a tin plating layer which becomes the joining layers 76 and 77 after having been joined so as to cover the nickel plating layer. Further, the drive magnet 68 is not magnetized before joined to the magnet connecting members 74 and 75. In this embodiment, a tin plating layer is not formed so as to cover the nickel plating layer on the surfaces of the magnet connecting members 74 and 75 before joined to the drive magnet 68. However, a tin plating layer may be formed so as to cover the nickel plating layer on the surfaces of the magnet connecting members 74 and 75.

When the drive magnets 68 and the magnet connecting members 74 and 75 are to be joined to each other, first, the drive magnets 68 and the magnet connecting members 74 and 75 are set in a joining jig in a state that the four drive magnets 68 are sandwiched between the magnet connecting member 74 and the magnet connecting member 75. After that, the drive magnets 68 and the magnet connecting members 74 and 75 are disposed in an induction coil. Further, an electric current is supplied to the induction coil while pressurizing and holding so that the drive magnets 68 and the magnet connecting member 74 are tightly contacted with each other and the drive magnets 68 and the magnet connecting member 75 are tightly contacted with each other. When the electric current is supplied to the induction coil, the drive magnets 68 and the magnet connecting members 74 and 75 are heated by eddy currents generated in the drive magnets 68 and the magnet connecting members 74 and 75 and thus, the tin plating layers on the surfaces of the drive magnets 68 are melted. Further, when the supply of the electric current to the induction coil is stopped, the melted tin-based metal is solidified to form the joining layers 76 and 77 and thus, the drive magnets 68 and the magnet connecting members 74 and 75 are joined to each other by the joining layers 76 and 77. In this embodiment, after the drive magnets 68 and the magnet connecting members 74 and 75 have been joined to each other, the four drive magnets 68 are simultaneously magnetized. Further, at the time of induction heating, the drive magnets 68 and the magnet connecting members 74 and 75 are heated to about 230° C. (degree C.)-300° C. (degree C.).

As described above, in this embodiment, the drive magnets 68 and the magnet connecting members 74 and 75 are joined to each other by the joining layers 76 and 77 which are formed so that the tin plating layer on the surface of the drive magnet 68 before joined to the magnet connecting members 74 and 75 are melted and solidified. Therefore, the joining layers 76 and 77 are not protruded from portions between the drive magnet 68 and the magnet connecting members 74 and 75. Accordingly, in this embodiment, even when a gap space between the drive magnet 68 and the drive coil 67 is set to be narrow in order to prevent a drive force from being lowered due to downsizing of the drive magnet 68 and the drive coil 67, the gap space between the drive magnet 68, the joining layers 76 and 77 and the drive coil 67 is formed with a high degree of accuracy. As a result, an interference of the camera module 52 with the fixed body 53 is prevented. In other words, in this embodiment, even when the size of the optical device 51 is reduced by reducing the sizes of the drive magnet 68 and the drive coil 67 and by narrowing a gap space between the drive magnet 13 and the drive coil 14, an interference of the camera module 52 with the fixed body 53 is prevented and the camera module 52 is swung appropriately.

In this embodiment, the tin plating layer which is formed on the surface of the drive magnet 68 before joined to the magnet connecting members 74 and 75 is melted by induction heating. In other words, in this embodiment, the drive magnets 68 and the magnet connecting members 74 and 75 are disposed in the induction coil and an electric current is supplied to the induction coil to melt the tin plating layer. Therefore, temperatures of the drive magnets 68 and the magnet connecting members 74 and 75 when the tin plating layers are to be melted are made uniform and thus variation of a joining strength of the drive magnet 68 to the magnet connecting member 74 and variation of a joining strength of the drive magnet 68 to the magnet connecting member 75 can be prevented. Further, in this embodiment, the tin plating layers can be melted without contacting the drive magnets 68 and the magnet connecting members 74 and 75 with the induction coil. Therefore, relative positional displacement of the drive magnets 68 and the magnet connecting members 74 and 75 from each other is prevented when the tin plating layers are to be melted.

In this embodiment, in a state that the drive magnet 68 is sandwiched between the magnet connecting members 74 and 75, the tin plating layer on the surface of the drive magnet 68 is melted and solidified to form the joining layers 76 and 77. Therefore, the drive magnets 68 and the magnet connecting members 74 and 75 are fixed to each other by one operation. Accordingly, in this embodiment, a fixing operation of the drive magnets 68 to the magnet connecting members 74 and 75 is easily performed.

In the second embodiment, the magnet connecting member 74 and the magnet connecting member 75 are fixed to the drive magnet 68. However, the present invention is not limited to this embodiment. For example, only one of the magnet connecting member 74 and the magnet connecting member 75 may be fixed to the drive magnet 68.

In the second embodiment, the optical device 51 is provided with an autofocus function but the optical device 51 may be provided with no autofocus function. In other words, the camera module 52 is not required to provide with the lens drive mechanism.

In the second embodiment, the optical device 51 is formed so that its shape when viewed in the optical axis direction is a substantially square shape. However, the optical device 51 may be formed so that its shape when viewed in the optical axis direction is a roughly rectangular shape. Further, the optical device 51 may be formed so that its shape when viewed in the optical axis direction is a roughly polygonal shape other than a rectangular shape or its shape when viewed in the optical axis direction is a circular shape or an elliptic shape.

Although the present invention has been shown and described with reference to the specific embodiments, various changes and modifications will be apparent to those skilled in the art from the teachings herein.

In the first embodiment, the tin plating layer on the surface of the drive magnet 13 are melted and solidified in a state that the drive magnet 13 is sandwiched between the cover member 10 and the magnetic member connecting body 21 and, in this manner, the cover member 10, the drive magnet 13 and the magnetic member connecting body 21 are simultaneously joined to each other. However, the present invention is not limited to this embodiment. For example, it may be structured that, first, the cover member 10 and the drive magnet 13 are joined to each other and, after that, the drive magnet 13 and the magnetic member connecting body 21 are joined to each other. Similarly, in the second embodiment, the tin plating layer on the surface of the drive magnet 68 are melted and solidified in a state that the drive magnet 68 is sandwiched between the magnet connecting member 74 and the magnet connecting member 75 and, in this manner, the drive magnet 68 and the magnet connecting members 74 and 75 are simultaneously joined to each other. However, it may be structured that, first, the drive magnet 68 and the magnet connecting member 74 are joined to each other and, after that, the drive magnet 68 and the magnet connecting member 75 are joined to each other.

In the first embodiment, when the cover member 10, the drive magnets 13 and the magnetic members 17 are to be joined to each other, the tin plating layers formed on the surfaces of the drive magnets 13 are melted by induction heating. However, the present invention is not limited to this embodiment. For example, it may be structured that, when the cover member 10, the drive magnets 13 and the magnetic members 17 are to be joined to each other, heater chips are abutted with the cover member 10, the magnetic members 17 and the like, the tin plating layers formed on the surfaces of the drive magnets 13 are melted. Alternatively, it may be structured that a laser beam is irradiated to boundary parts between the cover member 10 and the drive magnets 13 and to boundary parts between the drive magnets 13 and the magnetic members 17 and, in this manner, the tin plating layers formed on the surfaces of the drive magnets 13 are melted.

Similarly, in the second embodiment, when the drive magnets 68 and the magnet connecting members 74 and 75 are to be joined to each other, the tin plating layers formed on the surfaces of the drive magnets 68 are melted by induction heating. However, it may be structured that heater chips are abutted with the magnet connecting members 74 and 75 and the like, the tin plating layers formed on the surfaces of the drive magnets 68 are melted. Alternatively, it may be structured that a laser beam is irradiated to boundary parts between the drive magnets 68 and the magnet connecting member 74 and to boundary parts between the drive magnets 68 and the magnet connecting member 75 and, in this manner, the tin plating layers formed on the surfaces of the drive magnets 68 are melted.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. An optical device comprising:
    a movable body which holds a lens for photography;
    a fixed body which movably holds the movable body;
    a drive magnet and a drive coil for relatively moving the movable body with respect to the fixed body; and
    a metal member which is fixed to the drive magnet;
    wherein the drive magnet is fixed to one of the movable body and the fixed body, and the drive coil is fixed to the other of the movable body and the fixed body, and the drive magnet and the drive coil are oppositely disposed to each other through a predetermined gap space;
    wherein a nickel plating layer containing at least nickel is formed on a surface of the drive magnet and a surface of the metal member, and
    wherein the drive magnet and the metal member are joined to each other by a joining layer which is made of tin-based metal containing at least tin and is disposed between the drive magnet and the metal member.

2. The optical device according to claim 1, wherein:
    a tin plating layer which covers the nickel plating layer is formed on the surface of the drive magnet before the metal member is joined to the drive magnet, and
    the joining layer is formed by melting and solidifying the tin plating layer at a time of joining of the drive magnet to the metal member.

3. The optical device according to claim 2, wherein the tin plating layer is melted by induction heating at a time of joining of the drive magnet to the metal member.

4. The optical device according to claim 3, wherein:
    the metal member is fixed to an end face of the drive magnet in an optical axis direction of the lens, and
    the drive magnet and the drive coil are oppositely disposed to each other through the predetermined gap space in a direction perpendicular to the optical axis direction of the lens.

5. The optical device according to claim 4, wherein at least a part of the joining layer and the drive coil are oppositely disposed to each other through a predetermined gap space.

6. The optical device according to claim 2, wherein the metal member is comprised of a first metal member and a second metal member which are fixed to the drive magnet in a state that the drive magnet is sandwiched by the first metal member and the second metal member.

7. The optical device according to claim 6, wherein:
    the first metal member is comprised of one piece of the first metal member,
    the second metal member is comprised of a plurality of the second metal members,
    the drive magnet is comprised of a plurality of the drive magnets,
    each of the plurality of the second metal members is fixed to each of the plurality of the drive magnets, and
    each of the plurality of the second metal member is formed by removing a connecting member for connecting the plurality of the second metal members with each other.

8. The optical device according to claim 1, wherein:
    the metal member is fixed to an end face of the drive magnet in an optical axis direction of the lens, and
    the drive magnet and the drive coil are oppositely disposed to each other through the predetermined gap space in a direction perpendicular to the optical axis direction of the lens.

9. The optical device according to claim 8, wherein at least a part of the joining layer and the drive coil are oppositely disposed to each other through a predetermined gap space.

10. The optical device according to claim 8, wherein the metal member is comprised of a first metal member and a second metal member which are fixed to the drive magnet in a state that the first metal member and the second metal member sandwich the drive magnet.

11. The optical device according to claim 10, wherein:
    the first metal member is comprised of one piece of the first metal member,
    the second metal member is comprised of a plurality of the second metal members,
    the drive magnet is comprised of a plurality of the drive magnets,
    each of the plurality of the second metal members is fixed to each of the plurality of the drive magnets, and
    each of the plurality of the second metal members is formed with a removing trace which is formed when a connecting member for connecting the plurality of the second metal members with each other is removed.

12. The optical device according to claim 11, wherein:
the removing trace is formed at a tip end of a protruded part whose base end part is connected with the second metal member, and
a width of the removing trace is narrower than a width of the base end part of the protruded part and/or a thickness of the removing trace is thinner than a thickness of the base end part of the protruded part.

13. The optical device according to claim 1, wherein:
the movable body is held by the fixed body movably in an optical axis direction of the lens,
the drive coil is fixed to the movable body,
the drive magnet is fixed to the fixed body, and
the drive coil and the drive magnet relatively move the movable body in the optical axis direction with respect to the fixed body.

14. The optical device according to claim 13, wherein:
the drive magnet is formed in a substantially columnar shape or a substantially flat plate shape and is magnetized so that a magnetic pole of one face and a magnetic pole of the other face in the optical axis direction are different from each other,
the drive coil is oppositely disposed to a side face of the drive magnet in a direction perpendicular to the optical axis direction through a predetermined gap space so as to cover a part of the side face of the drive magnet, and
the metal member is fixed to each of both sides of the drive magnet in the optical axis direction.

15. The optical device according to claim 14, wherein:
the metal member which is fixed to one face of the drive magnet in the optical axis direction is a cover member structuring an outer peripheral face of the optical device, and
the cover member is formed to cover the metal member which is fixed to the other face of the drive magnet in the optical axis direction.

16. The optical device according to claim 1, wherein:
the movable body is swingably held by the fixed body so that an optical axis direction of the lens is inclined,
the drive coil is fixed to the fixed body,
the drive magnet is fixed to the movable body, and
the movable body is swung by the drive coil and the drive magnet with respect to the fixed body.

17. The optical device according to claim 16, wherein:
the drive magnet is formed in a substantially flat plate shape and is magnetized so that a magnetic pole of one side face and a magnetic pole of the other side face in a direction perpendicular to the optical axis direction are different from each other,
the drive coil is oppositely disposed to a side face of the drive magnet in a direction perpendicular to the optical axis direction through a predetermined gap space, and
the metal member is fixed to each of both end faces of the drive magnet in the optical axis direction.

18. The optical device according to claim 17, wherein:
the drive magnet is comprised of a plurality of drive magnets,
the drive coil is comprised of a plurality of drive coils,
the plurality of the drive magnets is fixed to an outer peripheral face of the movable body,
the fixed body is provided with a case body which is formed in a substantially tube-like shape and structures an outer peripheral face of the optical device,
the plurality of the drive coils is fixed to an inner peripheral face of the case body so as to respectively face the plurality of the drive magnets, and
the plurality of the drive magnets is connected by the metal member.

19. A manufacturing method for an optical device provided with a movable body which holds a lens for photography, a fixed body which movably holds the movable body, a drive magnet and a drive coil for relatively moving the movable body with respect to the fixed body, and a metal member which is fixed to the drive magnet and, in the optical device, the drive magnet is fixed to one of the movable body and the fixed body, and the drive coil is fixed to the other of the movable body and the fixed body, and the drive magnet and the drive coil are oppositely disposed to each other through a predetermined gap space, the manufacturing method comprising:
forming a nickel plating layer containing at least nickel on a surface of the drive magnet and a surface of the metal member;
forming a tin plating layer which is made of tin-based metal containing at least tin on the surface of the drive magnet before the metal member is joined so as to cover the nickel plating layer; and
melting and solidifying the tin plating layer to join the drive magnet and the metal member to each other at a time of joining of the drive magnet to the metal member.

20. The manufacturing method for an optical device according to claim 19, wherein the tin plating layer is melted by heating when the drive magnet and the metal member are held in a pressurized state.

21. The manufacturing method for an optical device according to claim 20, wherein the tin plating layer is melted by induction heating at a time of joining of the drive magnet to the metal member.

22. The manufacturing method for an optical device according to claim 20, wherein:
the drive magnet before joined to the metal member is in a non-magnetized state, and
the drive magnet is magnetized after the drive magnet and the metal member have been joined to each other.

23. The manufacturing method for an optical device according to claim 19, wherein:
the drive magnet is comprised of a plurality of the drive magnets,
the metal member is comprised of a plurality of the metal members which is fixed to each of the plurality of the drive magnets, and
each of the plurality of the metal members is formed so that, after the plurality of the drive magnets and the plurality of the metal members are joined to each other in a state that the plurality of the metal members are connected with each other through a connecting member, the connecting member is removed.

24. The manufacturing method for an optical device according to claim 23, wherein:
the connecting member is connected with the plurality of the metal members through respective connecting parts,
each connecting part is provided with a cutting-off part at least whose width is narrow or whose thickness is thin, and
after the plurality of the drive magnets and the plurality of the metal members have been joined to each other, the connecting member is removed by cutting off the cutting-off part.

25. The manufacturing method for an optical device according to claim 24, wherein:

the cutting-off part is formed so that a width of the cutting-off part is narrow and a thickness of the cutting-off part is thin, and the cutting-off part is disconnected by bending repeatedly.

* * * * *